US010142311B2

(12) United States Patent
Oshida

(10) Patent No.: US 10,142,311 B2
(45) Date of Patent: Nov. 27, 2018

(54) COMMUNICATION SYSTEM AND COMMUNICATION DEVICE

(71) Applicant: Renesas Electronics Corporation, Tokyo (JP)

(72) Inventor: Daisuke Oshida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 312 days.

(21) Appl. No.: 14/965,683

(22) Filed: Dec. 10, 2015

(65) Prior Publication Data

US 2016/0255065 A1 Sep. 1, 2016

(30) Foreign Application Priority Data

Feb. 26, 2015 (JP) .................................. 2015-036298

(51) Int. Cl.
*G06F 7/04* (2006.01)
*G06F 15/16* (2006.01)
(Continued)

(52) U.S. Cl.
CPC ............ *H04L 63/08* (2013.01); *H04L 9/3242* (2013.01); *H04L 61/6022* (2013.01);
(Continued)

(58) Field of Classification Search
CPC ....... H04L 63/08; H04L 69/324; H04L 69/22; H04L 61/6022; H04L 63/1441;
(Continued)

(56) References Cited

U.S. PATENT DOCUMENTS 9,032,501 B1 * 5/2015 Martin .................. H04L 9/3213
713/155
2009/0222666 A1 * 9/2009 Schneider ............. H04L 9/0844
713/171
(Continued)

FOREIGN PATENT DOCUMENTS

EP   2 775 660 A1   9/2014
JP   2013-098719 A   5/2013

OTHER PUBLICATIONS

Extended European Search Report dated May 2, 2016.
(Continued)

*Primary Examiner* — Shewaye Gelagay
*Assistant Examiner* — Amie C. Lin
(74) *Attorney, Agent, or Firm* — McGinn I.P. Law Group, PLLC

(57) ABSTRACT

Devices between which packets are transmitted and received include mutually corresponding packet counters. The same random number value is given to the packet counters as their initial values and the packet counters are updated with packet transmission/reception. The transmission-side device generates a MAC value, draws out part thereof on the basis of a counted value of its own packet counter, sets it as a divided MAC value, generates a packet by adding the value to a message and transmits the packet onto a network. The reception-side device generates a MAC value on the basis of the message in the received packet, draws out part thereof on the basis of a counted value of its own packet counter, compares the part with the divided MAC value in the received packet and thereby performs message authentication.

16 Claims, 9 Drawing Sheets

(51) Int. Cl.
  *G06F 17/30* (2006.01)
  *H04L 29/06* (2006.01)
  *H04L 9/32* (2006.01)
  *H04W 12/10* (2009.01)
  *H04L 29/12* (2006.01)
  *H04L 29/08* (2006.01)
  *H04W 4/48* (2018.01)

(52) U.S. Cl.
  CPC ........ *H04L 63/123* (2013.01); *H04L 63/1441* (2013.01); *H04L 69/22* (2013.01); *H04L 69/324* (2013.01); *H04W 12/10* (2013.01); *H04L 67/12* (2013.01); *H04L 2209/84* (2013.01); *H04W 4/48* (2018.02)

(58) Field of Classification Search
  CPC ..... H04L 63/123; H04L 9/3242; H04L 67/12; H04L 2209/84; H04W 12/10; H04W 4/48
  See application file for complete search history.

(56) References Cited

U.S. PATENT DOCUMENTS

| | | |
|---|---|---|
| 2011/0238989 A1 | 9/2011 | Machani et al. |
| 2013/0188065 A1* | 7/2013 | Wegener ................ H04N 5/232 348/207.99 |
| 2014/0310530 A1* | 10/2014 | Oguma ................ H04L 9/3242 713/181 |
| 2017/0195878 A1* | 7/2017 | Takemori .............. B60R 16/023 |

OTHER PUBLICATIONS

Keisuke Takemori, Seiichiro Mizoguchi, Hideaki Kawabata, Ayumu Kubota; "Protection for Automotive Control System Using Secure Boot and Authentication",IPSJ SIG Technical Report, Intelligent Transport Systems and Smart Community (ITS) , 2014-ITS-58(8), 1-8 (Sep. 12, 2014), Sep. 12, 2014.

Japanese Office Action, dated Jul. 24, 2018, in corresponding Japanese Patent Application Publication No. 2015-036298 and English Translation thereof.

* cited by examiner

FIG. 6
R1: INITIAL COUNTED VALUE
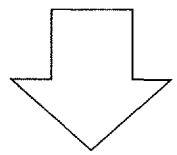  LOSSY COMPRESSION
FUNCTION
(e.g. SHA 256)
256-BIT VALUE
GENERATED FROM R1
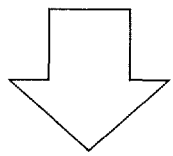
EXTRACT VALUE OF
THE LAST DIGIT (S1)
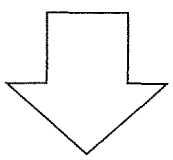
R2=R1+S1
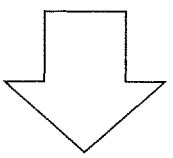  LOSSY COMPRESSION
FUNCTION
(e.g. SHA 256)
256-BIT VALUE
GENERATED FROM R2

COMMUNICATION SYSTEM AND COMMUNICATION DEVICE

CROSS-REFERENCE TO RELATED APPLICATIONS

The disclosure of Japanese Patent Application No. 2015-036298 filed on Feb. 26, 2015 including the specification, drawings and abstract is incorporated herein by reference in its entirety.

BACKGROUND

The present invention relates to a communication system and a communication device and, in particular, relates to the communication system and the communication device which are favorably utilized in communication that part of a message authentication code (MAC) is included in a communication packet over a network.

In various fields represented by, for example, the field of vehicle control systems, the importance of security and the needs for security are increased. In order to cope with the above-mentioned circumstances, in the field of embedded devices, the situation that a target product itself is physically attacked frequently occurs and therefore there is a tendency that security functions are concentrated on a hardware security module (HSM) which is high in tamper resistance.

The vehicle control system is configured by a plurality of electronic control units (ECUs) which are coupled to an on-vehicle network, such as, for example, a CAN (Controller Area Network) and so forth. In attacks on such a vehicle control system as mentioned above, leakage of messages which are exchanged over the CAN, tampering of the messages, distribution of a false message and so forth are included. In order to avoid the above-mentioned attacks, a technique of adding information for certificating the validity of a CAN packet to a CAN packet in communication between the ECUs and so forth is proposed.

In Japanese Unexamined Patent Application Publication No. 2013-98719, a technology of performing message authentication using the message authentication code (MAC) without changing the CAN protocol is disclosed. In each ECU which is coupled to the CAN, a frequency that the messages have been transmitted is counted for every CAN ID. The ECU which has transmitted the message generates one MAC from a data field and the CAN ID of a main message and a counted value corresponding to the CAN ID and transmits the generated MAC as one MAC message. The ECU which has received the main message generates another MAC from the data field and the CAN ID included in the main message and the counted value corresponding to the CAN ID, compares the generated MAC with the MAC included in the MAC message and thereby verifies the validity of the main message.

In "Protection of On-Vehicle Control System by Secure Boot+Authentication" written by Takahiro Takemori, Seiichiroh Mizoguchi, Hideaki Kawabata and Ayumu Kubota, in Research Report of Information Processing Society of Japan, Intelligent Transportation Systems and Smart Community (ITS), 2014-ITS-58, Information Processing Society of Japan, Sep. 12, 2014, a CAN packet authentication technology that the technology described in Japanese Unexamined Patent Application Publication No. 2013-98719 has been improved is disclosed. Since there is a limitation on the size of the CAN packet, only some bits in the calculated MAC value is included in the CAN packet. In the transmission side ECU, high-order L-1-n bits of a value of a transmission packet counter are used for calculation of the MAC value, and low-order n bits of the value of the transmission packet counter are used to indicate the position of a frame of some bits (Xs bits) to be extracted from the calculated MAC value. That is, in the transmission side ECU, the MAC value is calculated from the main message, secret information which is shared between the transmission side and the reception side and the high-order L-1-n bits of the value of the transmission packet counter, the Xs bits at the frame position which is designated by the low-order n bits of the value of the transmission packet counter are extracted from that MAC value and thereby the CAN packet is configured by adding the Xs bits so extracted to the main message. In the reception side ECU, the high-order L-1-n bits of a value of a reception packet counter which are the same as those of the transmission side ECU are used for calculation of the MAC value, and the low-order n bits thereof are used in order to indicate the position of the frame of some bits (Xr bits) to be extracted from the calculated MAC value. That is, in the reception side ECU, the MAC value is calculated from the main message in the received CAN packet, the secret information which is shared with the transmission side and the high-order L-1-n bits of the value of the reception packet counter and the Xr bits at the frame position designated by the low-order n bits of the value of the reception packet counter are extracted from the MAC value so calculated. The Xs bits of the MAC value in the received CAN packet are compared with the Xr bits in the MAC value that the reception side ECU itself has calculated, and when both of the Xs bits mutually match, it is authenticated that the received CAN packet is valid.

SUMMARY

As a result of studies that the inventors and others have made on Japanese Unexamined Patent Application Publication No. 2013-98719 and "Protection of On-Vehicle Control System by Secure Boot+Authentication" written by Takahiro Takemori, Seiichiroh Mizoguchi, Hideaki Kawabata, Ayumu Kubota, Takahiro Takemori, Seiichiroh Mizoguchi, Hideaki Kawabata and Ayumu Kubota, in Research Report of Information Processing Society of Japan, Intelligent Transportation Systems and Smart Community (ITS), 2014-ITS-58, it was found that there still remain new subject matters as follows.

In the technology disclosed in "Protection of On-Vehicle Control System by Secure Boot+Authentication" written by Takahiro Takemori, Seiichiroh Mizoguchi, Hideaki Kawabata, Ayumu Kubota, Takahiro Takemori, Seiichiroh Mizoguchi, Hideaki Kawabata and Ayumu Kubota, in Research Report of Information Processing Society of Japan, Intelligent Transportation Systems and Smart Community (ITS), 2014-ITS-58, each of ECUs on the transmission side and the reception side includes an HSM which is called a secure element and the damper resistance of this part is secured for the purpose of generating a MAC. However, since the packet counter is provided on the outside of the HSM, it was found that securing of the confidentiality and the integrity of the communication path through which data is input into and output from the HSM is not sufficient in the ECU. It was found that, for example, when the ECU is configured by coupling together the host processor with no security function and the HSM via the communication path, even when encryption is performed on the host processor side using software so as to ensure the confidentiality, the resistance to a so-called replay attack that probing and so forth are performed on the communication path between the host processor and the HSM and old information is released is low.

Although measures for solving such subject matters as mentioned above will be described as follows, other subject matters and novel features of the present invention will become apparent from the description of the specification and the appended drawings.

According to one embodiment of the present invention, there is provided a communication system which is configured as follows.

That is, in a communication system which includes a plurality of devices which are mutually coupled via a network so as to transmit and receive packets between/among them, each of the devices for transmitting and receiving the packets includes a packet counter corresponding to that of a communication mate. The same random number value is given to the corresponding packet counters as their initial values and the packet counters (the values of the packet counters) are respectively updated in association with transmission and reception of the packets. The device on the side of transmitting a message generates one message authentication code (one MAC value) on the basis of the message, draws out part of the MAC value on the basis of a counted value of its own packet counter, sets the part as a divided message authentication code (a divided MAC value), generates the packet by adding the divided MAC value to the message and transmits the packet onto the network. The device which has received the packet generates another message authentication code (another MAC value) on the basis of the message included in the received packet, draws out part of the MAC value on the basis of a counted value of its own packet counter, compares the part with the divided message authentication code (the divided MAC value) included in the received packet and thereby performs message authentication.

The advantageous effect obtained by the above-mentioned one embodiment of the present invention will be briefly described as follows.

That is, it becomes difficult to observe or estimate the counted value of the packet counter from the outside and therefore it becomes possible to improve the confidentiality and the integrity of the communication path (the network) between/among the plurality of devices.

BRIEF DESCRIPTION OF THE DRAWINGS

FIG. 6 is a flowchart illustrating one example of a flow for setting an increment value of the packet counter to a random number.

DETAILED DESCRIPTION

Preferred embodiments of the present invention will be described in detail.

First Embodiment

Packet Counter is Initialized with a Random Number

Figure 1:
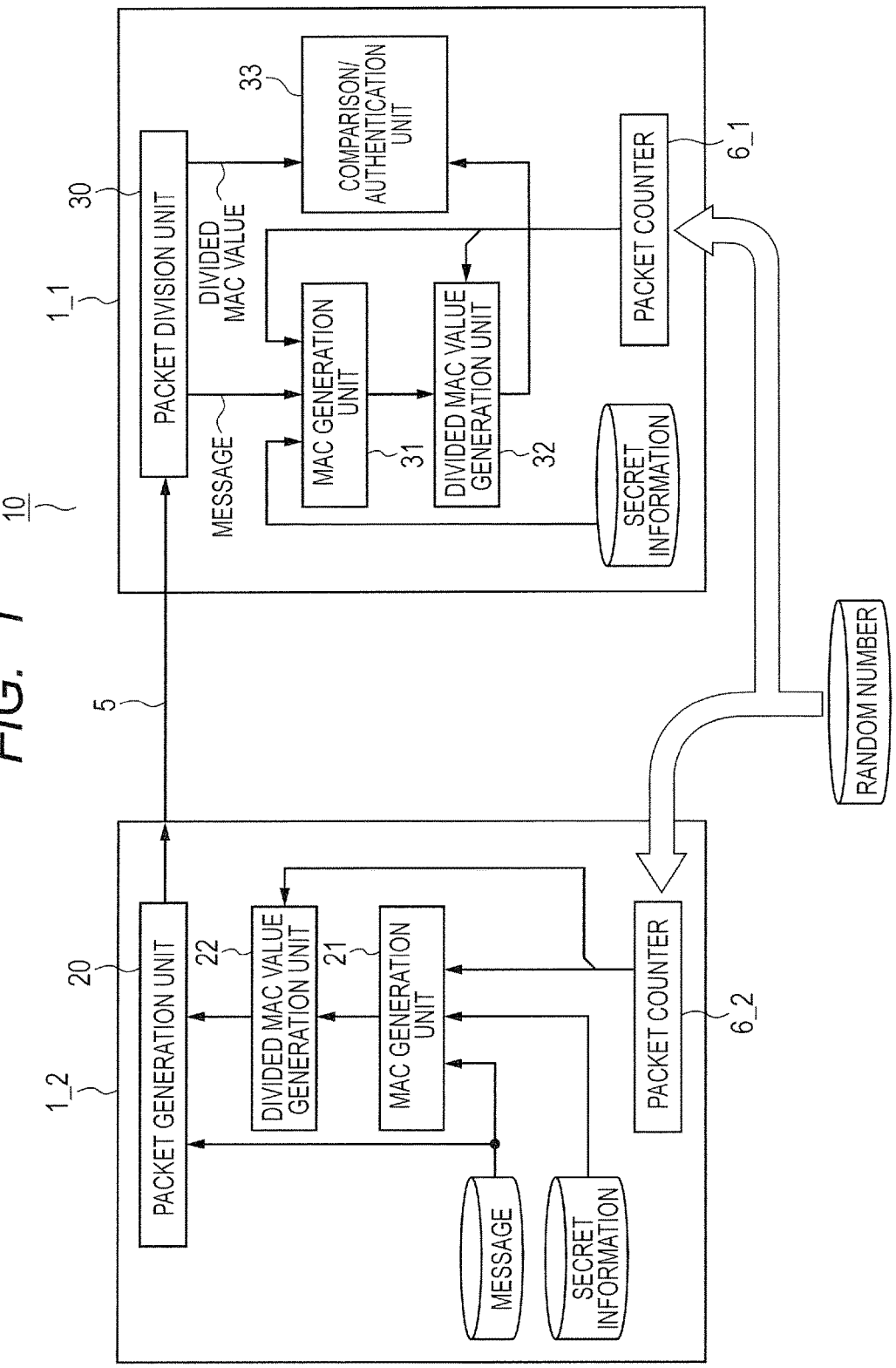
FIG. 1 is a block diagram illustrating one configurational example of a communication device and one configurational example of a communication system configured by including the communication device according to a first embodiment.

FIG. 1 is a block diagram illustrating one configurational example of a communication device and one configurational example of a communication system which is configured by including the communication device. A communication system 10 is configured by including a first communication device 1_2 and a second communication device 1_1 which are mutually coupled via a network 5 so as to transmit and receive a packet. Other communication devices may be coupled to the network 5. In addition, the network 5 may be a hierarchical network and may be configured by also including a relay device between the first communication device 1_2 and the second communication device 1_1. In addition, the network 5 may be a communication path of any type through which it is possible to transmit the packet regardless of whether it is wired or wireless.

The first communication device 1_2 and the second communication device 1_1 respectively include packet counters 6_2 and 6_1. The same random number value is given to the packet counters 6_2 and 6_1 as their initial values and the packet counters are respectively updated in association with transmission and reception of the packet between the first communication device 1_2 and the second communication device 1_1. Mutually different packet counters may be provided for packet transmission from the first communication device 1_2 to the second communication device 1_1 and for packet transmission in a reverse direction from the second communication device 1_1 to the first communication device 1_2. The first and second communication devices 1_2 and 1_1 are configured such that in a case where the transmission side device updates its own packet counter when the packet is to be transmitted, the reception side device also updates its own packet counter when the packet has been received, coping with updating of the packet counter of the transmission side device and are controlled such that the packet counters on both sides hold the same counted value. At that time, an increment value of each packet counter which is incremented coping with transmission and reception of one packet is not necessarily limited to "1" and may take an optional value as long as the same counted value is held in the packet counters on the both sides in association with transmission and reception of the packet.

A message to be transmitted to the second communication device 1_1 and secret information used for generating the message authentication code (the MAC value) are given to the first communication device 1_2. The first communication device 1_2 includes a packet generation unit 20, a MAC generation unit 21, a divided MAC value generation unit 22 and so forth. The packet generation unit 20, the MAC generation unit 21, the divided MAC value generation unit 22 and so forth are functional blocks which are implemented by executing software on a processor that the first communication device 1_2 includes. All or some of the functional blocks may be implemented by dedicated hardware elements instead of implementation by software.

When the message is to be transmitted to the second communication device 1_1, the first communication device 1_2 generates one MAC value in the MAC generation unit 21 on the basis of the message and the secret information. The divided MAC value generation unit 22 draws data on position (a frame position) of some bits which are designated on the basis of a counted value of the packet counter 6_2 out of the generated MAC value and sets the drawn-out data as one divided MAC value. The packet generation unit 20 generates the packet which includes the message and the divided MAC value and transmits the packet onto the network 5, addressing to the second communication device 1_1.

Secret information used for authenticating the MAC value is given to the second communication device 1_1. The second communication device 1_1 includes a packet division unit 30, a MAC generation unit 31, a divided MAC value generation unit 32, a comparison/authentication unit 33 and so forth. The packet division unit 30, the MAC generation unit 31, the divided MAC value generation unit 32, the comparison/authentication unit 33 and so forth are functional blocks implemented by executing software on a processor that the second communication device 1_1 includes. All or some of the functional blocks may be implemented by hardware elements instead of implementation by software.

The second communication device 1_1 extracts the message and the divided MAC value from the packet by the packet division unit 30 when the packet has been received from the first communication device 1_2 over the network 5. The MAC generation unit 31 generates another MAC value from the message which has been extracted from the received packet, the secret information and a counted value of the packet counter 6_1. The divided MAC value generation unit 32 draws data on position (the frame position) of some bits designated on the basis of the counted value of the packet counter 6_1 out of the generated MAC value and sets the drawn-out data as another divided MAC value. The comparison/authentication unit 33 compares the divided MAC value which has been extracted from the packet so received by the packet division unit 30 with the divided MAC value which has been generated by the MAC generation unit 31 and the divided MAC value generation unit 32 and authenticates the received message on the basis of a result of comparison. Here, it is not the case that the received message is authenticated only when the divided MAC value which has been extracted from the received packet exactly matches the divided MAC value which has been internally generated. As later described in [Fluctuation of packet counters is absorbed], it is also possible to determine that message authentication has been successfully performed even when a disparity occurs between the counted values of the packet counters of the transmission side device and the reception side device.

It becomes difficult to observe or estimate the counted values of the packet counters 6_1 and 6_2 from the outside by giving the random number value as the initial values of the packet counters 6_1 and 6_2 and it becomes possible to improve the confidentiality and the integrity of the communication path (the network 5) between the first communication device 1_2 and the second communication device 1_1.

Here, although description has been made by limiting to the case where the first communication device 1_2 is the message transmission side and the second communication device 1_1 is the message reception side with reference to FIG. 1, the message may be transmitted reversely or bi-directionally. In this case, the first communication device 1_2 may further include the packet division unit, the MAC generation unit which generates the MAC value from the message extracted from the received packet, the divided MAC value generation unit, the comparison/authentication unit and so forth and the second communication device 1_1 may further include the packet generation unit, the MAC generation unit, the divided MAC value generation unit and so forth.

[Application to Communication Between/Among ECUs Coupled to CAN]

It is possible to configure the communication system by configuring the first and second communication devices respectively by the ECUs and configuring the network 5 by the on-vehicle network (the CAN).

Figure 2:
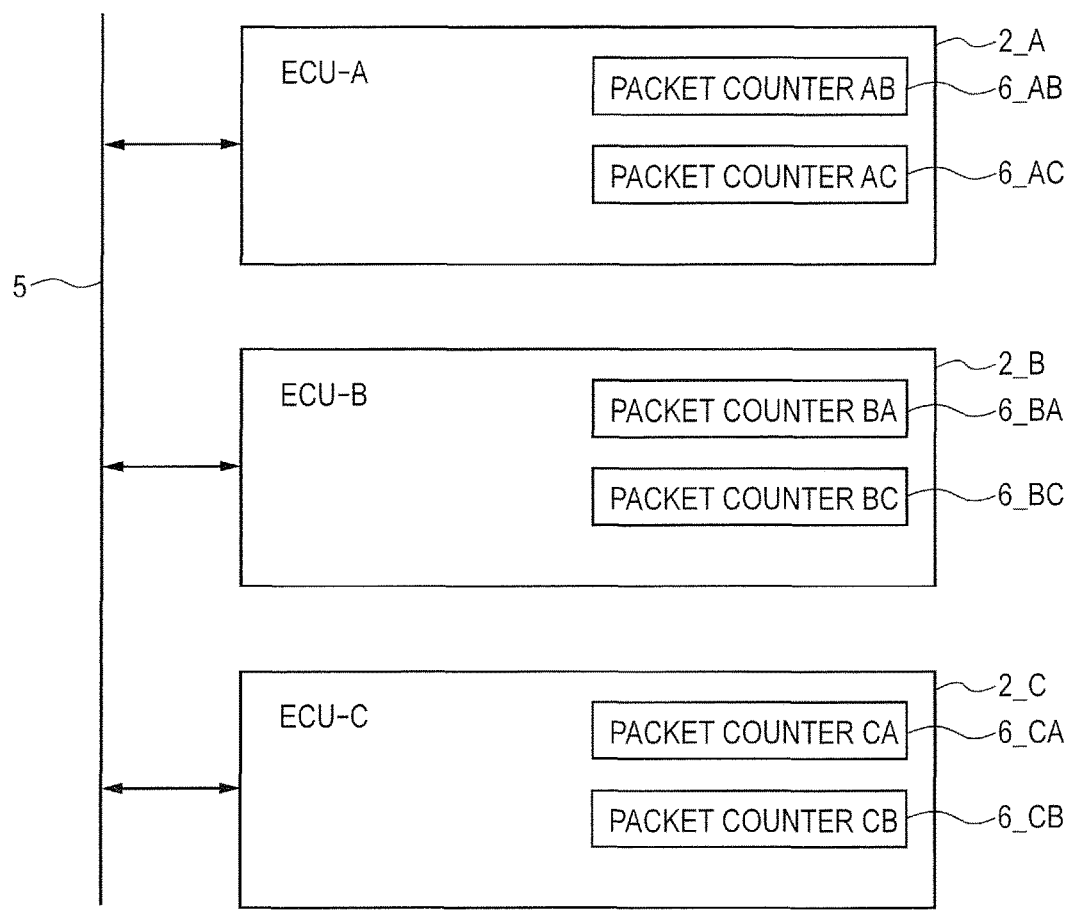
FIG. 2 is a block diagram illustrating one configurational example of a communication system in which each of the communication devices is the electronic control unit (ECU) and which is configured by mutually coupling the ECUs via the on-vehicle network (the CAN).

FIG. 2 is a block diagram illustrating one configurational example of the communication system in which the communication devise are configured by the electronic control units (the ECUs) and which is configured by mutually coupling the ECUs via the on-vehicle network (the CAN). A plurality of ECUs, that is, an ECU-A (2_A), an ECU-B (2_B) and an ECU-C (2_C) are coupled to the CAN 5. The ECU-A (2_A) includes a packet counter AB (6_AB) and a packet counter AC (6_AC), the ECU-B (2_B) includes a packet counter BA (6_BA) and a packet counter BC (6_BC) and the ECU-C (2_C) includes a packet counter CA (6_CA) and a packet counter CB (6_CB). The packet counter AB (6_AB) and the packet counter BA (6_BA) are provided so as to cope with packet communication between the ECU-A (2_A) and the ECU-B (2_B). Likewise, the packet counter AC (6_AC) and the packet counter CA (6_CA) are provided so as to cope with the packet communication between the ECU-A (2_A) and the ECU-C (2_C) and the packet counter BC (6_BC) and the packet counter CB (6_CB) are provided so as to cope with the packet communication between the ECU-B (2_B) and the ECU-C (2_C). When the ECUs perform one-to-one packet communication, the packet counters of the ECUs which perform the packet communication are initialized with the same random number value. When one-to-plurality communication is to be performed as in broadcasting, the packet counters of all of the ECUs which participate in the one-to-plurality communication are initialized with the same random number value.

Thereby, it is possible to improve the confidentiality and the integrity of the communication between/among the electronic control units (the ECUs) which are mutually coupled via the CAN.

[Application to HOST-to-HSM Communication]

It is possible to apply the above mentioned communication between the first and second communication devices to communication between a host processor (the HOST) which configures the ECU and the hardware security module (the HSM). As described in the opening paragraph of the present specification, in the embedded device which is represented by the vehicle control system and is high in importance and needs for the security, the situation that the target device (product) itself is physically attacked frequently occurs and therefore there is the tendency that the HSM which is high in tamper resistance and the security functions are concentrated on the HSM.

Figure 3:
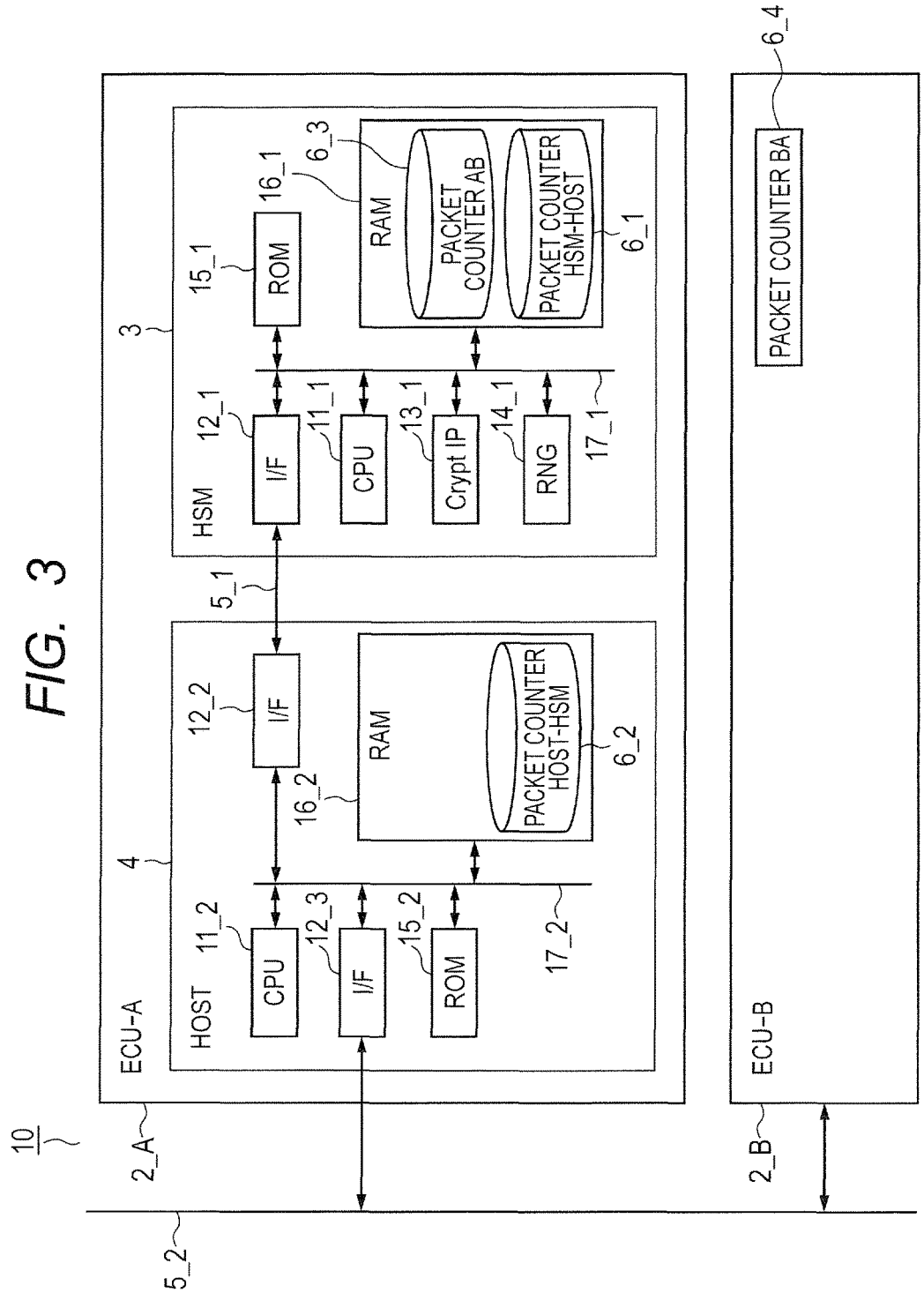
FIG. 3 is a block diagram illustrating one configurational example of a communication system which is configured by mutually coupling the plurality of ECUs as the communication devices over the CAN and in which one of the communication devices (the ECUs) is configured by a HOST and the hardware security module (HSM) having the tamper resistance.

FIG. 3 is a block diagram illustrating one configurational example that the communication system is configured by mutually coupling the plurality of ECUs as the communication devices via the CAN and one of the ECUs is configured by including the HOST and the HSM having the tamper resistance. Although the plurality of ECUs may be coupled to a CAN 5_2 similarly to the example in FIG. 2, the example that only the ECU-A (2_A) and the ECU-B (2_B) are coupled to the CAN 5_2 and the ECU-A (2_A) is configured by including a HOST 4 and the HSM 3 having the tamper resistance which are mutually coupled via a network 5_1 is illustrated in FIG. 3.

The HOST 4 is configured by mutually coupling a CPU 11_2, an interface (I/F) 12_3 with the CAN 5_2, an interface (I/F) 12_2 with the network 5_1, a ROM 15_2 and a RAM 16_2 via a bus 17_2. The HSM 3 is configured by mutually coupling a CPU 11_1, an interface (I/F) 12_1 with the network 5_1, a ROM 15_1, a RAM 16_1, a crypt IP 13_1 and a random number generation circuit (RNG) 14_1 via a bus 17_1. The crypt IP 13 is a circuit module which executes data processing relevant to cryptographic communication having the tamper resistance and may be configured by packaging a well-known tamper resistance function. Protective measures against the attacks to the cryptographic communication are taken such that, for example, a parameter which is to be kept confidential is stored so as not to observe from the outside and data dependency is not exhibited in fluctuation waveforms of operation time and power consumption when a predetermined cryptographic operation is to be executed.

A program which functions as the packet generation unit 20, the MAC generation unit 21 and the divided MAC value generation unit 22 by being executed by the CPU 11_2 is stored in the ROM 15_2 of the HOST 4. A program which functions as the packet division unit 30, the MAC generation unit 32, the divided MAC value generation unit 32 and the comparison/authentication unit 33 by being executed by the CPU 11_1 is stored in the ROM 15_1 of the HSM 3. The packet communication performed between the HOST 4 and the HSM 3 over the network 5_1 is executed by using a packet counter HSM-HOST (6_2) which is held in the RAM 16_2 in the HOST 4 and a packet counter HSM-HOST (6_1) which is held in the RAM 16_1 in the HSM 3. On the other hand, the packet communication performed between the ECU-A (2_A) and the ECU-B (2_B) over the CAN 5_2 is executed by using a packet counter AB (6_3) which is held in the RAM 16_1 in the HSM 3 of the ECU-A (2_A) and a packet counter BA (6_4) that the ECU-B (2_B) includes. Although the packet counter AB (6_3) may be held in the RAM 16_2 in the HOST 4, the tamper resistance thereof is more increased when the packet counter AB (6_3) is held in the RAM 16_1 in the HSM 3 than held in the RAM 16_2. The packet counter HOST-HSM (6_2), the packet counter HSM-HOST (6_1) and the packet counter AB (6_3) may be implemented by dedicated counters instead of being held in the RAM 16_2 in the HOST 4 or the RAM 16_1 in the HSM 3.

It is possible to improve the confidentiality and the integrity of the communication path (the network) between a general HOST which is not the HSM (has no security function) and the HSM by applying the communication which has been described with reference to FIG. 1 to the packet communication performed between the HST 4 and the HSM 3 over the network 5_1.

Here, the configurations which are illustrated as those of the HOST 4 and the HSM 3 are mere examples. The network 5_1 may be configured by an optional communication path such as, for example, the CAN, an SPI (Serial Peripheral Interface) and so forth. In the HOST 4 and the HSM 3, the buses 17_1 and 17_2 may be respectively hierarchized. In addition, the HOST 4 may be configured by appropriately including functional blocks other than the illustrated functional blocks such as, for example, an interruption control circuit, a direct memory controller, a timer, other peripheral devices and so forth. The same also applies to the HSM 3. Although the configurational example that the CPU 11_1 is loaded is illustrated as the example of the HSM 3, a sequencer may be used in place of the CPU 11_1. Although it is desirable for the HSM 3 to have the tamper resistance, a semiconductor device which simply includes the constitutional elements illustrated in FIG. 3 may be used as the HSM 3. Although not particularly limited, the HOST 4 and the HSM 3 are respectively formed on isolated semiconductor substrates made of silicon and so forth by using a well-known CMOS (Complementary Metal-Oxide-Semiconductor field effect transistor) LSI (Large Scale Integrated circuit) manufacturing technology. When the HOST 4 and the HSM 3 are separately formed on the different semiconductor chips as mentioned above and are communicated with each other over the network 5_1, it is possible to improve the confidentiality and the integrity of the communication by initializing the packet counters with the random number value, against the attack made by observing the network 5_1. On the other hand, the HOST 4 and the HSM 3 may be loaded in a mixed state on the same semiconductor chip. In this case, it is possible to more improve the confidentiality and the integrity of the communication by configuring so as not to draw the network 5_1 outside the semiconductor chip.

[Random Number Value is Generated by HSM, Encrypted and Transmitted to HOST]

The operation of the ECU-A (2_A) illustrated in FIG. 3 will be described.

Figure 4:
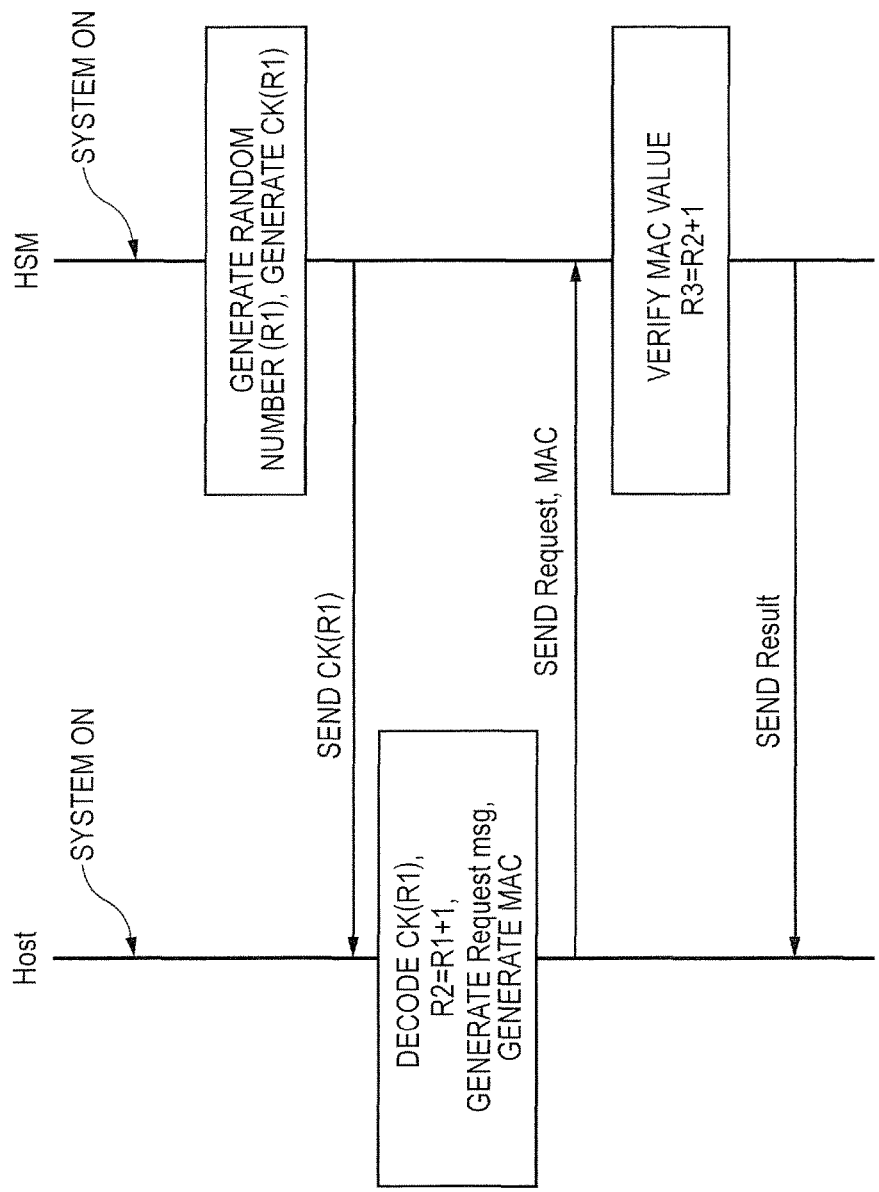
FIG. 4 is a flowchart illustrating one example of a communication flow in the first embodiment.

FIG. 4 is a flowchart illustrating one example of a communication flow in the first embodiment. The processing steps respectively executed by the HOST 4 and the HSM 3 and the contents of data to be transmitted and received are illustrated in a time series running from top to bottom.

First, the HOST 4 and the HSM 3 are respectively started (System ON). The HSM 3 generates a random number R1 by the random number generation circuit (RNG) 14_1 and encrypts the random number R1 by the crypt IP 13_1 by using a common key CK. The random number R1 which has been encrypted by using the common key CK will be denoted as "CK (R1)". The HSM 3 sets the generated random number R1 in the packet counter HSM-HOST (6_1) as the initial value. The HSM 3 sends the encrypted random number CK (R1) to the HOST 4 over the network 5_1. In the HOST 4, the encrypted random number CK (R1) is decoded by using the common key CK which has been shared in advance with the HSM 3. At this stage, the HOST 4 performs increment of one packet by setting the decoded random number R1 as the initial value of the packet counter HOST-HSM (6_2). That is, the HOST 4 updates the value of the packet counter HOST-HSM (6_2) to R2=R1+1. When requesting signature generation, signature verification and other processing relevant to the crypt to the HSM 3, the HOST 4 generates a request message (Request msg), generates the MAC value from the message so generated and R2 which is the counted value of the packet counter HOST-HSM (6_2) and adds the generated MAC value to the message. The MAC value may be generated by using a general technology such as, for example, a CMAC (Cipher based Message Authentication Code) and so forth. The HOST 4 generates the packet which includes the request message (Request) and the MAC value and sends the packet to the HSM 3. In the HSM 3 which has received the packet, after the validity of the message has been verified (MAC Value Verification) from the MAC value included in the packet, processing of the message is executed and a result of execution (Result) is sent to the HOST 4. At this time, the value of the packet counter HSM-HOST (6_1) is updated to R3=R2+1. A communication message which is issued during this processing is encrypted by using the common key CK. When the MAC value which is generated from the received message and the counted value of its own packet counter HSM-HOST (6_1) is different from the received MAC value in verification of the MAC value, the flow shifts to unauthorized act processing. The unauthorized act processing may include processing of "absorbing a fluctuation of packet counters" which will be described later. Thereby, it becomes possible to prevent spoofing of the message and it is possible to improve the confidentiality and the integrity of the communication.

Here, generation of the MAC value respectively executed by the HOST 4 and the HSM 3 is arithmetic processing to be executed on the basis of the target message to be transmitted and received and the counted values of the packet counters HOST-HSM (6_2) and HSM-HOST (6_1) of the HOST 4 and the HSM 3. Here, the system may be configured such that the HOST 4 and the HSM 3 further share secret information so as to make the secret information contribute to arithmetic operations for MAC value generation to be executed respectively in the HOST 4 and the HSM 3. Thereby, it is possible to more improve the confidentiality and the integrity of the communication.

[Absorbing a Fluctuation of Packet Counter]

In the above-mentioned MAC value verification, it is set as a precondition that the counted values of the packet counters HOST-HSM (6_2) and HSM-HOST (6_1) are in synchronization with each other. Here, "synchronization" may not necessarily indicate that the packet counters take the same value at the same time. That is, the counted values may be updated to the same value with a certain time lag and values which come to mutually correspond by following a fixed rule may be taken even when these values are mutually different. That is, any value may be taken as long as it is possible for the reception side to reproduce the counted value which has been used for generation of the MAC value on the transmission side and it is possible to generate the same MAC value on the transmission side and the reception side by using the value.

However, there are cases where synchronization loss occurs between the packet counters HOST-HSM (6_2) and HSM-HOST (6_1) due to communication errors and so forth. Such synchronization loss between the packet counters will be referred to as a "fluctuation of packet counter". Since such a fluctuation of packet counter may possibly occur even when the system normally operates, it is desirable to absorb the fluctuation up to a certain width. On the other hand, in a system that the confidentiality and the integrity of the communication are preferred, there are also cases where it is desirable to immediately take a protective measure by regarding the fluctuation as the attack from the outside. Which measure is to be adopted depends on the security policy of the HSM 3 and the HOST 4 in system design.

Figure 5:
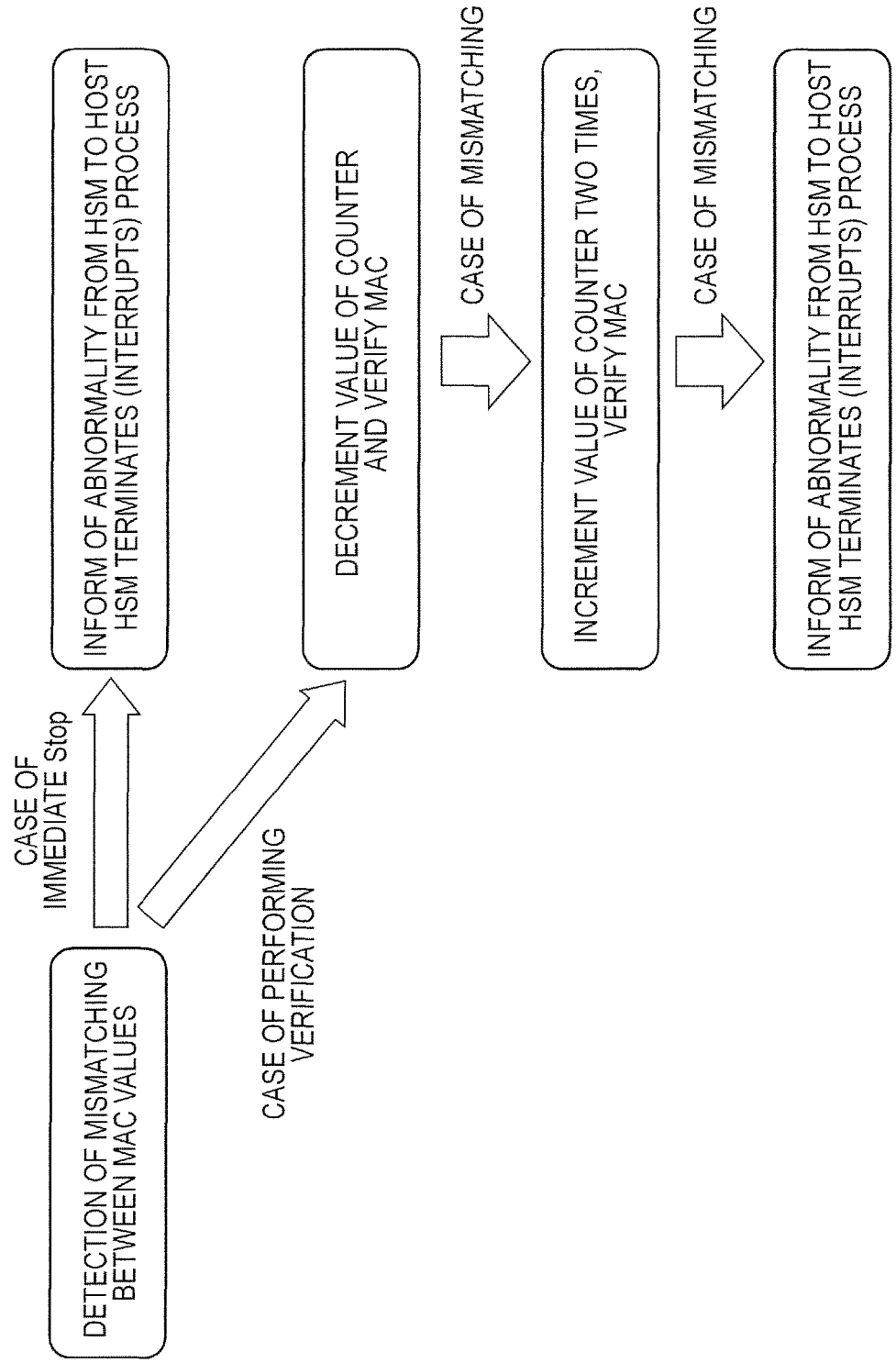
FIG. 5 is a flowchart illustrating one example of a flow for absorbing fluctuation of packet counters.

FIG. 5 is a flowchart illustrating one example of a flow for absorbing the fluctuation of packet counter.

In MAC value verification which is performed on the side of the HSM 3, when the received MAC value is different from the MAC value which is generated from the received message and the counted value of its own packet counter HSM-HOST (6_1) (Detection of Mismatching between MAC Values), any of a case where the operation is immediately stopped as the unauthorized act processing (Case of Immediate Stop) and a case of shifting to the fluctuation absorbing processing (Case of Performing Verification) may be adopted. The former is adopted when in the system that the confidentiality and the integrity of the communication are preferred, the protective measure is immediately taken by regarding the fluctuation as the attack from the outside. The latter is adopted when the fluctuation of packet counter is absorbed.

In "Case of Immediate Stop", occurrence of abnormality is informed of from the HSM 3 to the HOST 4 and the HSM 3 interrupts or terminates the process which is being executed.

In "Case of Performing Verification", the example that the fluctuation of packet counter is allowed up to ±one packet is illustrated in FIG. 5. After mismatching between the MAC values has been detected, the counted value of the packet counter HSM-HOST (6_1) is decremented and verification of the MAC value is again performed. When the MAC value generated in this step has matched the received MAC value, it is determined that the received message is normal and the flow shifts to processing of the message. In "Case of Mismatching", the counted value is decremented two times and verification of the MAC value is again performed. When the MAC value generated by this step has matched the received MAC value, it is determined that the received message is normal and the flow shifts to processing of the message. In "Case of Mismatching", occurrence of abnormality is informed of from the HSM 3 to the HOST 4 and the HSM 3 interrupts or terminates the process which is being executed.

Here, a decrement value and the increment value are not necessarily set to "1" and other random number values may be used as indicated in a second embodiment which will be described later. In addition, it may be also modified so as to allow the fluctuation of packet counter up to a range which is wider than the range of ±one packet. That is, verification of the MAC value is repetitively performed by comparing each of the plurality of MAC values which are generated on the basis of the plurality of counted values which respectively correspond to the received packets ranging from the received packet which has been received earlier than the received packet concerned by "i" packets ("i" is an optional integer) to the received packet which will be received later than the received packet concerned by "j" packets ("j" is an optional integer) with the received MAC value. When at least one MAC value has matched the received MAC value, it is determined that the message concerned is normal and the flow shifts to the processing of the message. When all of the MAC values do not match the received MAC value, occurrence of abnormality is informed of from the HSM 3 to the HOST 4 and the HSM 3 interrupts or terminates the process which is being executed. Values of "i" and "j" may be optionally set depending on the security policy of the system. Since the larger the values of "i" and "j" are, the more a replay attack is facilitated, it is desirable that the values of "i" and "j" be both not more than "3". In addition, when the width of fluctuation is small, it is determined that the message concerned is normal and the flow may shift to the processing of the message. However, when the width of fluctuation is somewhat large, instead of shifting to processing of immediately stopping the operation, the flow may shift to such moderate processing as to shift to the processing of the message and so forth, while giving some sort of warning and taking such a defensive measure as to promote security enhancement and so forth by another method.

Although, here, the configuration and the method of absorbing the fluctuation of packet counter have been described as such one modified example of the first embodiment that the initial values of the packet counters HSM-HOST (6_1) and HOST-HSM (6_2) are set to the random number, the initial values of the packet counters are not necessarily the random number. Also in a case where the values of the packet counters are initialized to "1" or "0" as has been conducted so far, it is possible to apply the above-mentioned configuration and method to this case and it is possible to obtain the same advantageous effects. In addition, although, here, description has been made by taking the communication between the HOST 4 and the HSM 3 which configure the ECU 2 by way of example, it is also possible to apply the above-mentioned configuration and method to the communication between optional communication devices in the same way. For example, it is also possible to apply the above-mentioned configuration and method to the communication between the ECUs which are coupled together via the CAN.

Second Embodiment

Increment Values of the Packet Counters are Also Set to Random Numbers

Since in the example that the first embodiment has been described with reference to FIG. 4, such a simple increment that the values of the packet counters HSM-HOST (6_1) and HOST-HSM (6_2) are respectively incremented by "1" is made, there is the possibility that an attacker may easily estimate the next counted value. Accordingly, it is effective to make it difficult for the attacker to estimate the next counted value by setting the value to be incremented to a random number.

FIG. 6 is a flowchart illustrating one example of a flow for setting the values to be incremented of the packet counters to a random number.

A random number R1 (an initial counted value) which is to be set as the initial values of the packet counters HSM-HOST (6_1) and HOST-HSM (6_2) is compressed by using a lossy compression function such as, for example, a SHA-256 and so forth. The last one digit of a fixed value obtained in compression is extracted and is set as a numerical value S1 to be incremented. R2 (=R1+S1) which is obtained by adding the value S1 to the random number R1 is set as the next counted value. The further next counted value is generated by performing increment by using a value S2 which has been generated from the value R2 by using the lossy compression function such as, for example, the SHS-256 and so forth. It becomes difficult for the attacker to estimate the number of increments of the counter by using such a method as mentioned above.

Figure 7:
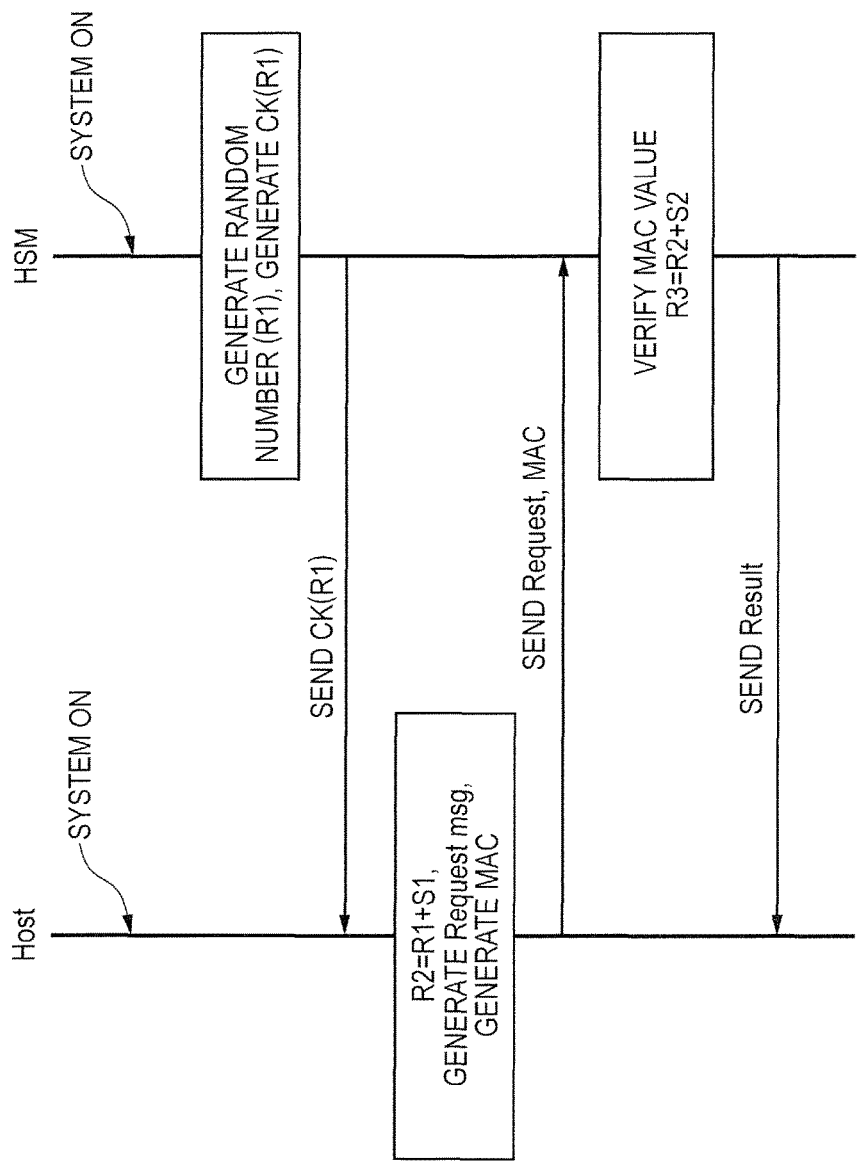
FIG. 7 is a flowchart illustrating one example of a communication flow in a second embodiment.

FIG. 7 is a flowchart illustrating one example of a communication flow in the second embodiment. Similarly to the flowchart in FIG. 4, the processing steps respectively executed by the HOST 4 and the HSM 3 and the contents of data to be transmitted and received are illustrated in a time series running from top to bottom.

First, the HOST 4 and the HSM 3 are respectively started (System ON). The HSM 3 generates the random number R1 by the random number generation circuit (RNG) 14_1 and encrypts the random number R1 by the crypt IP 13_1 by using the common key CK. The HSM 3 sets the generated random number R1 in the packet counter HSM-HOST (6_1) as the initial value. The HSM 3 sends the encrypted random number CK (R1) to the HOST 4 over the network 5_1. In the HOST 4, the encrypted random number CK (R1) so received is decoded by using the common key CK. At this stage, the HOST 4 performs increment of one packet by setting the decoded random number R1 as the initial value of the packet counter HOST-HSM (6_2). That is, the HOST 4 updates the value of the packet counter HOST-HSM (6_2) to R2=R1+S1. The HOST 4 generates the request message (Request msg) for the HSM, generates the MAC value from that message and R2 which is the counted value of the packet counter HOST-HSM (6_2) and adds the generated MAC value to the message. The HOST 4 generates the packet which includes the request message (Request) and the MAC value and sends the packet to the HSM 3. In the HSM 3 which has received the packet, after the validity of the message has been verified from the MAC value included in the packet (MAC Value Verification), processing of the message is executed and a result (Result) of execution is sent to the HOST 4. At that time, the value of the packet counter HSM-HOST (6_1) is updated to R3=R2+S2. The communication message which is issued during this processing is encrypted by using the common key CK.

The flow in FIG. 6 is different from the flow in FIG. 4 in the point that the increment value is set to the random number as described above with reference to FIG. 5. Thereby, it becomes difficult to estimate the counted values of the packet counters HOST-HSM (6_2) and HSM-HOST (6_1) which correspond to the next packet and it is possible to more improve the confidentiality and the integrity of the communication.

Although in the second embodiment, description has been made by taking the communication between HOST 4 and the HSM 3 which configure the ECU 3 by way of example, it is also possible to apply the configuration according to the second embodiment to the communication between the optional communication devices. For example, it is also possible to apply the above-mentioned configuration to the communication between the ECUs which are coupled together over the CAN.

Third Embodiment

Cryptic Functionality is Also Loaded on Host

In the description based on the configurational example illustrated in FIG. 3 in the first and second embodiments, the system of encrypting the random number by using the common key CK which has been shared in advance between the HOST 4 and the HSM 3 in the communication between the HOST 4 and the HSM 3 has been indicated. In contrast, when the cryptic functionality is loaded on the HOST 4 or when it is possible to calculate the crypt by the CPU 11_2 of the HOST 4, it is possible to exchange the common key CK after both of the HOST 4 and the HSM 3 have been authenticated by using the public key cryptosystem.

Figure 8:
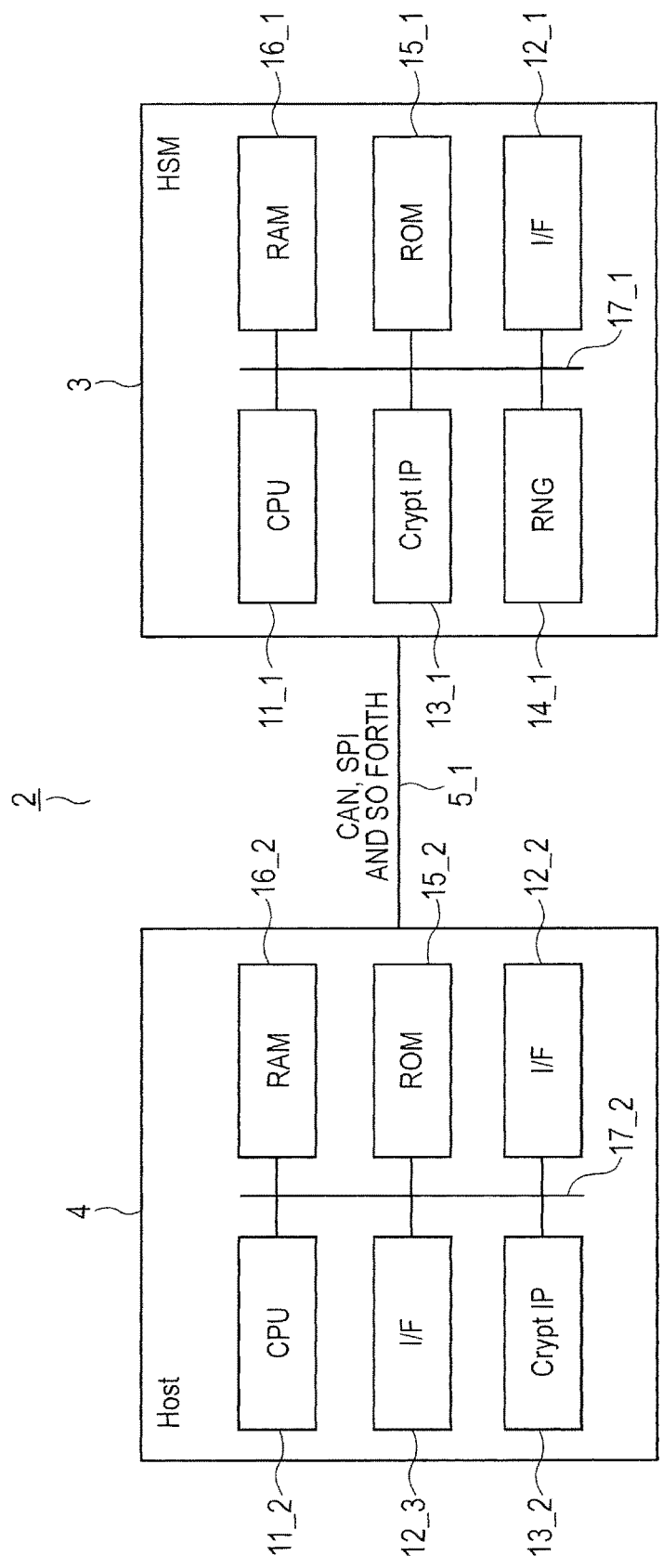
FIG. 8 is a block diagram illustrating one configurational example of an ECU of the type that a cryptic functionality is also loaded on the HOST.

FIG. 8 is a block diagram illustrating a configurational example of the ECU 2 that the cryptic functionality is also loaded on the HOST 4. The ECU corresponds to the ECU-A (2_A) illustrated in FIG. 3. The HOST 4 includes the CPU 11_2, the interface (I/F) 12_3 with the CAN 5_2, the interface (I/F) 12_2 with the network 5_1, the ROM 15_2, the RAM 16_2 and so forth which are coupled together via the bus 17_2 similarly to the HOST 4 to be loaded on the ECU-A (2_A) illustrated in FIG. 3. The ECU 2 according to the third embodiment is different from the ECU-A (2_A) illustrated in FIG. 3 in the point that the HOST 4 further includes a crypt IP 13_2. The crypt IP 13_2 is a circuit module which executes data processing relevant to the cryptographic communication by having the tamper resistance similarly to the crypt IP 13_1 illustrated in FIG. 3. The network 5_1 and the HSM 3 are respectively the same as the network 5_1 and the HSM 3 to be loaded on the ECU-A (2_A) illustrated in FIG. 3. Since description made in the first embodiment is applied as it is, excepting that the crypt 13_2 is added to the HOST 4, repetitive description thereof is omitted.

The operation of the ECU 2 will be described.

Figure 9:
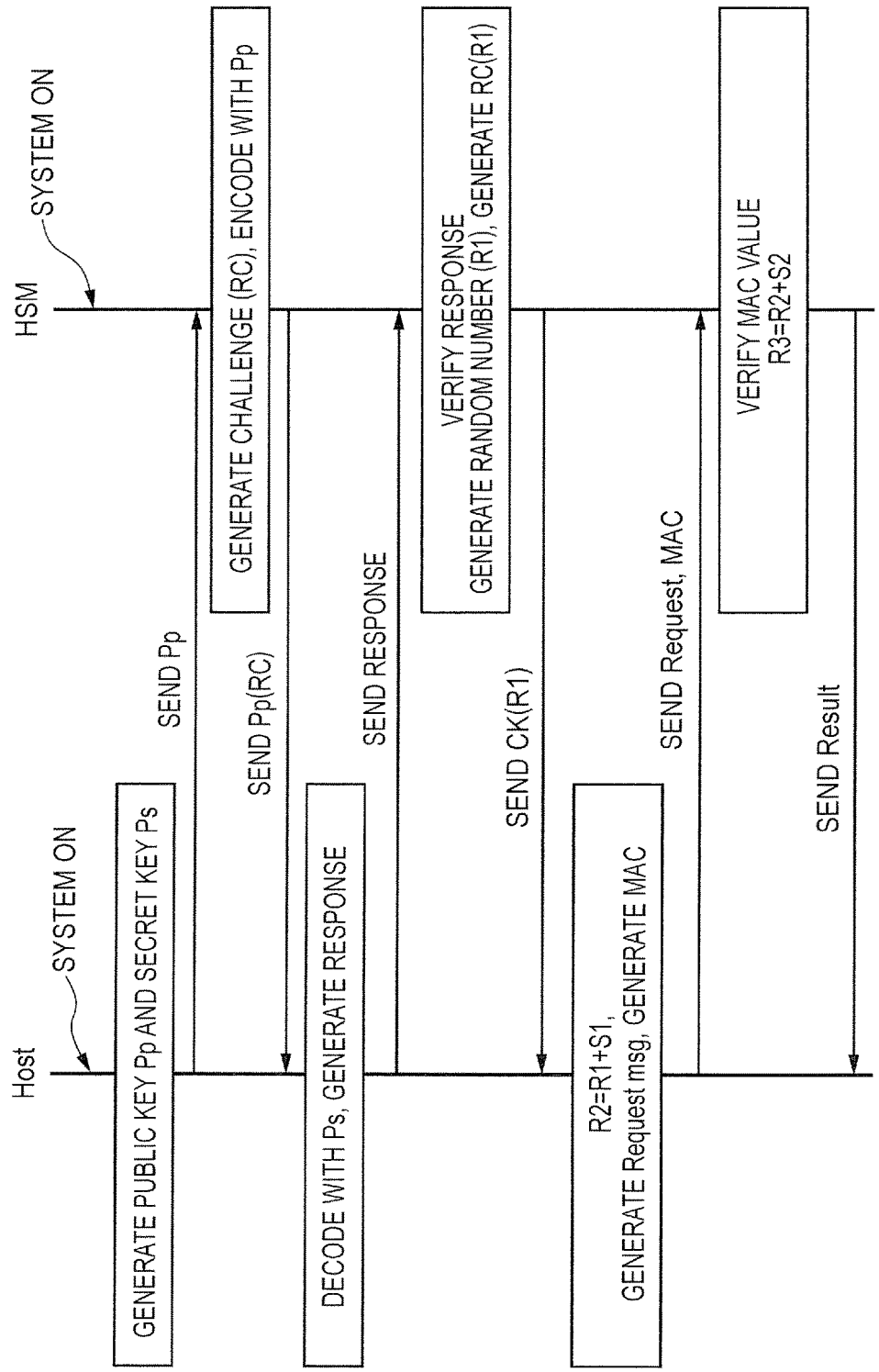
FIG. 9 is a flowchart illustrating one example of a communication flow in a third embodiment.

FIG. 9 is a flowchart illustrating one example of a communication flow in the third embodiment. The processing steps which are respectively executed by the HOST 4 and the HSM 3 and the contents of data to be transmitted and received are illustrated in a time series running from top to bottom similarly to the examples in FIG. 4 and FIG. 7.

First, the HOST 4 and the HSM 3 are respectively started (System ON). The HOST 4 generates a public key Pp and a secret key Ps by the crypt IP 13_2 and sends the generated public key Pp to the HDSM 3. The HSM 3 generates a random number RC by the random number generation circuit (RNG) 14_1 and encrypts the random number RC by the crypt IP 13_1 by using the received public key Pp. The random number RC which has been encrypted by using the public key Pp will be denoted as "Pp (RC)". The HSM 3 sends the encrypted random number Pp (RC) to the HOST 4 as challenge data. The HOST 4 decodes the received challenge data by the crypt IP 13_2 by using the secret key Ps, generates response data and sends the response data to the HSM 3. The HSM 3 verifies the received response data by performing expected value comparison and confirms that the HOST 4 is the authentic communication device.

Then, the HSM 3 generates the random number R1 by the random number generation circuit (RNG) 14_1 and encrypts the random number R1 by the crypt IP 13_1 by using the common key CK. Since the subsequent flow is the same as the flow of the second embodiment which has been described with reference to FIG. 7, description thereof is omitted. It is also possible to make the subsequent flow the same as the flow of the first embodiment which has been described with reference to FIG. 4.

Thereby, it is possible to improve the resistance to the attack that the attacker tries to illegally acquire the random number value which is set as the initial values of the packet counters and it is possible to improve the confidentiality and the integrity of the communication path (the network) between the HSM 3 and the HOST 4.

Although in the third embodiment, description has been made by taking the communication between the HOST 4 and the HSM 3 which configure the ECU 2 by way of example, it is also possible to apply the configuration according to the third embodiment to the communication between the optional communication devices in the same way. For example, it is also possible to apply the above-mentioned configuration to the communication between the ECUs which are coupled together over the CAN.

Although it is possible to omit a key exchange sequence by using the random number RC which has been utilized in the above-mentioned challenge as the common key CK between the HOST 4 and the HSM 3, a sequence of exchanging the common key may be separately added.

In the foregoing, the invention which has been made by the inventors and others of the present invention has been specifically described on the basis of the preferred embodiments. However, it goes without saying that the present invention is not limited to the above-mentioned embodiments and may be altered and modified in a variety of ways within the scope not deviating from the gist of the present invention.

What is claimed is:

1. A communication system, comprising:
a first device and a second device which are mutually coupled via a network so as to transmit and receive packets over the network,
wherein the first device and the second device respectively include a first packet counter and a second packet counter,
wherein a same random number value is given to the first and second packet counters as initial values of the first and second packet counters, and the first and second packet counters are respectively updated by the first device and the second device in association with each transmission and each reception of the packets by using values generated from performing a same lossy compression function on counted values of the first and the second packet counters as increment values,
wherein, when a message is to be transmitted to the second device, the first device generates a message authentication code on a basis of the message, draws out a part of the message authentication code on a frame position of some bits which are designated on a basis of a counted value of the first packet counter, sets the drawn-out part of the message authentication code as a divided message authentication code, generates a packet which includes the message and the divided message authentication code, and transmits the packet which includes the message and the divided message authentication code to the second device over the network, and
wherein, when the packet has been received from the first device, the second device generates another message authentication code on a basis of the message included in the received packet, draws out a part of the another message authentication code on the frame position of some bits which are designated on a basis of a counted value of the second packet counter, compares the drawn-out part of the another message authentication code with the divided message authentication code included in the received packet and performs a message authentication on the basis of a result of the comparison.

2. The communication system according to claim 1, wherein one of the first and second devices generates the same random number value, sets the generated same random number value as an initial value of a respective packet counter of the one of the first and second devices, converts the same random number value into a cipher by encryption, and transmits the cipher to the other of the first and second devices, and the other of the first and second devices decodes the cipher to restore the same random number value, and sets the restored same random number value as the initial value of a respective packet counter of the other of the first and second devices.

3. The communication system according to claim 2, wherein the encryption conforms to a common key cryptosystem.

4. The communication system according to claim 3, wherein the first and second devices execute challenge/response authentication which conforms to a public key cryptosystem before transmitting and receiving the same random number value for an encryption of values of the first and second packet counters.

5. The communication system according to claim 1, wherein, when the packet has been received, the part which has been drawn out of the another message authentication code which has been generated on a basis of the message included in the received packet on a basis of the counted value of the second packet counter by the second device is set as a central bit array, wherein the second device further draws a plurality of bit arrays of the another message authentication code out of positions based on counted values in a plurality of message authentication code (MAC) values, the plurality of MAC values are generated on a basis of a plurality of counted values respectively corresponding to received packets ranging from a first received packet which has been received earlier than a received packet associated with "i" packets ("i" is an integer) to a second received packet to be received later than a received packet associated with "j" packets ("j" is an integer), and wherein the second device compares each of the central bit array and the plurality of bit arrays with the divided message authentication code included in the received packet and authenticates the received packet as a valid packet when at least one bit array matches the divided message authentication code.

6. The communication system according to claim 5, wherein the "i" and the "j" are set to "1s".

7. The communication system according to claim 1, wherein at least one of the first and second devices includes a hardware security module.

8. The communication system according to claim 1, wherein the first and second devices include respectively electronic control units, and the network includes an on-vehicle network.

9. A communication system, comprising:
a first device and a second device which are mutually coupled via a network so as to transmit and receive packets over the network,
wherein the first device and the second device respectively include a first packet counter and a second packet counter which are respectively updated the first device and the second device in association with each transmission and each reception of the packets by using values generated from performing a same lossy compression function on counted values of the first and the second packet counters as increment values,
wherein, when a message is to be transmitted to the second device, the first device generates a message authentication code on a basis of the message, draws out a part of the message authentication code on a frame position of some bits which are designated on a basis of a counted value of the first packet counter, sets the drawn-out part of the message authentication code as a divided message authentication code, generates a packet which includes the message and the divided message authentication code and transmits the packet to the second device over the network,
wherein, when the packet has been received from the first device, the second device generates another message authentication code on a basis of the message included in the received packet, draws out a part of the another message authentication code on the frame position of some bits which are designated on a basis of a counted value of the second packet counter and sets the drawn-out part of the another message authentication code on the basis of the counted value of the second packet counter as a central bit array,
wherein the second device further draws a plurality of bit arrays of the another message authentication code out of positions based on counted values in a plurality of message authentication code (MAC) values, the plurality of MAC values are generated on a basis of a plurality of counted values respectively corresponding to received packets ranging from a first received packet which has been received earlier than a received packet associated with "i" packets ("i" is an integer) to a second received packet to be received later than a received packet associated with "j" packets ("j" is an integer), and
wherein the second device compares each of the central bit array and the plurality of bit arrays with the divided message authentication code included in the received packet and authenticates the received packet as a valid packet when at least one bit array matches the divided message authentication code.

10. The communication system according to claim 9, wherein the "i" and the "j" are set to "1s".

11. A communication device, which is coupled with another communication device which includes a first packet counter via a network, so as to transmit and receive packets to and from the another communication device via the network and authenticates a message in a packet received from the another communication device, the communication device comprising:
a second packet counter which corresponds to a first packet counter, wherein the another communication device and the communication device respectively update the first and second packet counters in association with each transmission and each reception of the packets by using values generated from performing a same lossy compression function on counted values of the first and second packet counters as increment values; and
a hardware security module,
wherein a random number which has been generated by the hardware security module is set as an initial value of the second packet counter, and the random number is subjected to encryption and is transmitted to the another communication device in order to make the another communication device set the encrypted random number as an initial value of the first packet counter,
wherein a packet which is received from the another communication device is a packet which has been generated by the another communication device by generating a message authentication code on a basis of a message to be transmitted, drawing out a part of the message authentication code on a frame position of some bits which are designated on a basis of a counted value of the first packet counter, setting the drawn-out part of the message authentication code as a divided message authentication code and including the message and the divided message authentication code in the packet, and
wherein, when the packet has been received from the another communication device, the communication device generates another message authentication code on a basis of the message included in the received packet, draws out a part of the generated another message authentication code on the frame position of some bits which are designated on a basis of a counted value of the second packet counter, compares the drawn-out part of the generated another message authentication code with the divided message authentication code included in the received packet and thereby performs message authentication on the basis of a result of the comparison.

12. The communication device according to claim 11, wherein the encryption conforms to a common key cryptosystem.

13. The communication device according to claim 12, wherein the communication device executes challenge/response authentication which conforms to a public key cryptosystem between the communication device and the another communication device before the random number is transmitted to the another communication device.

14. The communication device according to claim 11, wherein, when the packet has been received, the part which has been drawn out of the another message authentication code which has been generated on a basis of the message included in the received packet on a basis of the counted value of the second packet counter by the communication device is set as a central bit array, wherein the communication device further draws a plurality of bit arrays of the another message authentication code out of positions based on counted values in a plurality of message authentication code (MAC) values, the plurality of MAC values are generated on a basis of a plurality of counted values respectively corresponding to received packets ranging from a first received packet which has been received earlier than a received packet associated with "i" packets ("i" is an integer) to a second received packet to be received later than a received packet associated with "j" packets ("j" is an integer), and wherein the second device compares each of the central bit array and the plurality of bit arrays with the divided message authentication code included in the received packet and authenticates the received packet as a valid packet when at least one bit array matches the divided message authentication code.

15. The communication device according to claim 14, wherein the "i" and the "j" are set to "1 s".

16. The communication device according to claim 11, wherein the communication device and the another communication device include communication devices which configure an electronic control unit which is coupled to an on-vehicle network, and the network which mutually couples the communication device and the another communication device includes a network which is the same as or is different from the on-vehicle network.

* * * * *